United States Patent [19]

Azuma et al.

[11] Patent Number: 4,798,259
[45] Date of Patent: Jan. 17, 1989

[54] FRONT WHEEL SPEED-UP MECHANISM FOR A FOUR WHEEL DRIVE VEHICLE WHEN TURNING

[75] Inventors: Toshiro Azuma, Minoo; Toshiyuki Hacegawa, Ashiya, both of Japan

[73] Assignee: Kanzaki Kokyukoki Mfg. Co., Amagasaki, Japan

[21] Appl. No.: 132,061

[22] Filed: Dec. 11, 1987

[30] Foreign Application Priority Data

Jun. 25, 1987 [JP] Japan .................. 62-159107

[51] Int. Cl.$^4$ ............................................. B60K 17/34
[52] U.S. Cl. ............................. 180/233; 180/75.1; 180/900
[58] Field of Search ............ 180/75.1, 248, 249, 180/250, 247, 233

[56] References Cited

U.S. PATENT DOCUMENTS 4,574,910  3/1986  Miki et al. .................. 180/75.1
4,723,623  2/1988  Teraoka et al. ............. 180/75.1

Primary Examiner—John A. Pekar
Attorney, Agent, or Firm—Saidman, Sterne, Kessler & Goldstein

[57] ABSTRACT

A front wheel speed-up mechanism for a four wheel drive vehicle when turning, which, when front wheels serve as steering wheels, corrects a delay at the rotational circumferential speed of the front wheels later than the actual moving speed when the vehicle is turning, thereby gradually increasing the rotational circumferential speed of the front wheels in proportion to a length of a turning radius thereof.

7 Claims, 6 Drawing Sheets

FRONT WHEEL SPEED-UP MECHANISM FOR A FOUR WHEEL DRIVE VEHICLE WHEN TURNING

FIELD OF THE INVENTION

The present invention relates to a front wheel speed-up mechanism for a four wheel drive vehicle whose front wheels are steering wheels, which corrects a delay in the rotationally circumferential speed of the front wheel lower than the actual traveling speed when the vehicle turns, thereby approximately equalizing the traveling speed to the front wheel rotationally circumferential speed when the vehicle turns.

DESCRIPTION OF THE PRIOR ART

The prior art has been disclosed in the Japanese Patent Laid-Open Gazette No. Sho 54-120138 (Patent Laid-Open on Sept. 18, 1979), which two-stage-changes the rotationally circumferential speed of front wheels so as to be increased only when the four wheel drive vehicle turns.

For increasing the rotationally circumferential speed of the front wheel when the vehicle turns, the speed is not changed in two high and low stages, but a differential gear is interposed so as to increase the speed in proportion to a length of a turning radius as shown in FIG. 9, which is also well-known.

Next, explanation will be given on the technique shown in FIG. 9.

Between a front wheel driving shaft 1 and a front wheel pinion shaft 2 are interposed a speed-up bevel gear shaft 10, speed-up bevel gears 44 and 45, a front wheel pinion bevel gear 2b, and a braking bevel gear 12 in combination.

In the normal straight forward running state, the braking bevel gear 12 is integral with the front wheel driving shaft 1 through retaining pawls 39a and 40a.

When a steering handle is rotated for steering a vehicle, the retaining pawls 39a and 40a disengage from each other, and a speed-up shifter 39 urges friction plates 41 and 42 interposed between the braking bevel gear 12 and a bearing case to thereby gradually stop rotation of the braking bevel gear 12. Lastly, the braking bevel gear 12 stops its rotation so that the speed-up bevel gears 44 and 45 freely sleeved onto the outer periphery of the speed-up bevel gear shaft 10 rotate.

This technique is that the speed-up bevel gears 44 and 45 rotate to allow the front wheel pinion bevel gear 2b to rotate two times faster than the front wheel driving shaft 1.

In addition, a reference numeral 40 designates a retainer cylinder provided at the outer periphery of the front wheel driving shaft 1 and having a retaining pawl 40.

In the aforesaid prior art, however, a shifter arm 36 in association with a steering handle 27 and longitudinally turned through an arm 37 when the vehicle is steered to turn, directly urges the outer periphery of the speed-up shifter 39 or the rear surface of a slider 38 fitted thereon.

Therefore, a force to directly fixedly urged the slider 38 and friction plates 41 and 42 is required in addition to an operating force for the steering handle 27, whereby there is the inconvenience that a handle operating force becomes larger as a turning radius decreases.

SUMMARY OF THE INVENTION

The present invention aims at eliminating the above inconvenience. Namely, a mechanical auxiliary control mechanism is provided so as to prevent the operating force for a steering handle from being subjected to a force for urging to control the friction plates 41 and 42.

An object of the invention is to provide a front wheel speed-up mechanism which can utilize by an actuator a torque of the front wheel driving shaft so as to obtain a force to stop a braking bevel gear boss, thereby having an operating force for the steering handle similar to the conventional one.

Another object of the invention is to provide a front wheel speed-up mechanism which can reduce the number of friction plates in comparison with the prior art so that there is less fear that the friction plates contact with each other to rotate together, thereby reducing a loss of an engine horse power.

A further object of the invention is to provide a front wheel speed-up mechanism which is less in number of friction plates and can use them smaller in diameter, thereby being compact as a whole.

Other objects and aspects of the invention will become apparent from the following description of the embodiment with reference to the accompanying drawings.

DESCRIPTION OF A PREFERRED EMBODIMENT

Next, explanation will be given on an embodiment of a front wheel speed-up mechanism of the invention shown in the accompanying drawings.

Figure 1:
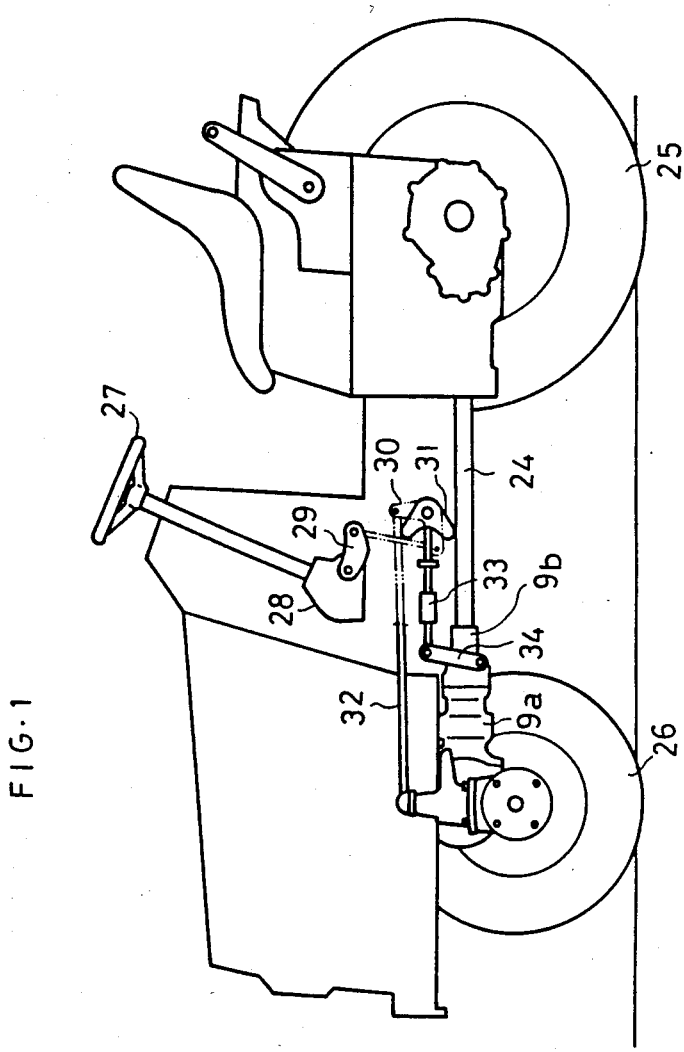
FIG. 1 is a side view of a front wheel speed-up mechanism of the present invention for a four wheel drive vehicle when turned.

In FIG. 1, a steering handle 27 is disposed in front of an operation seat.

When the operator rotates the steering handle 27 for steering a vehicle, a pitman arm 29 at a steering gear box 28 rotates.

A bell crank 30 is turned by a link extending from the pitman arm 29 and connected to one end of crank 30. To the other end of bell crank 30 is connected a tie rod 32 which is connected with a knuckle arm for each front wheel.

A steering cam 31 is fixed onto a shaft for pivotally supporting the bell crank 30 and urges a link 33 with a buffer longitudinally of the vehicle.

The link 33 with the buffer is connected at the utmost end to a speed-up operating arm 34. In addition, a reference numeral 26 designates a front wheel and 25 a rear wheel.

Figure 2:
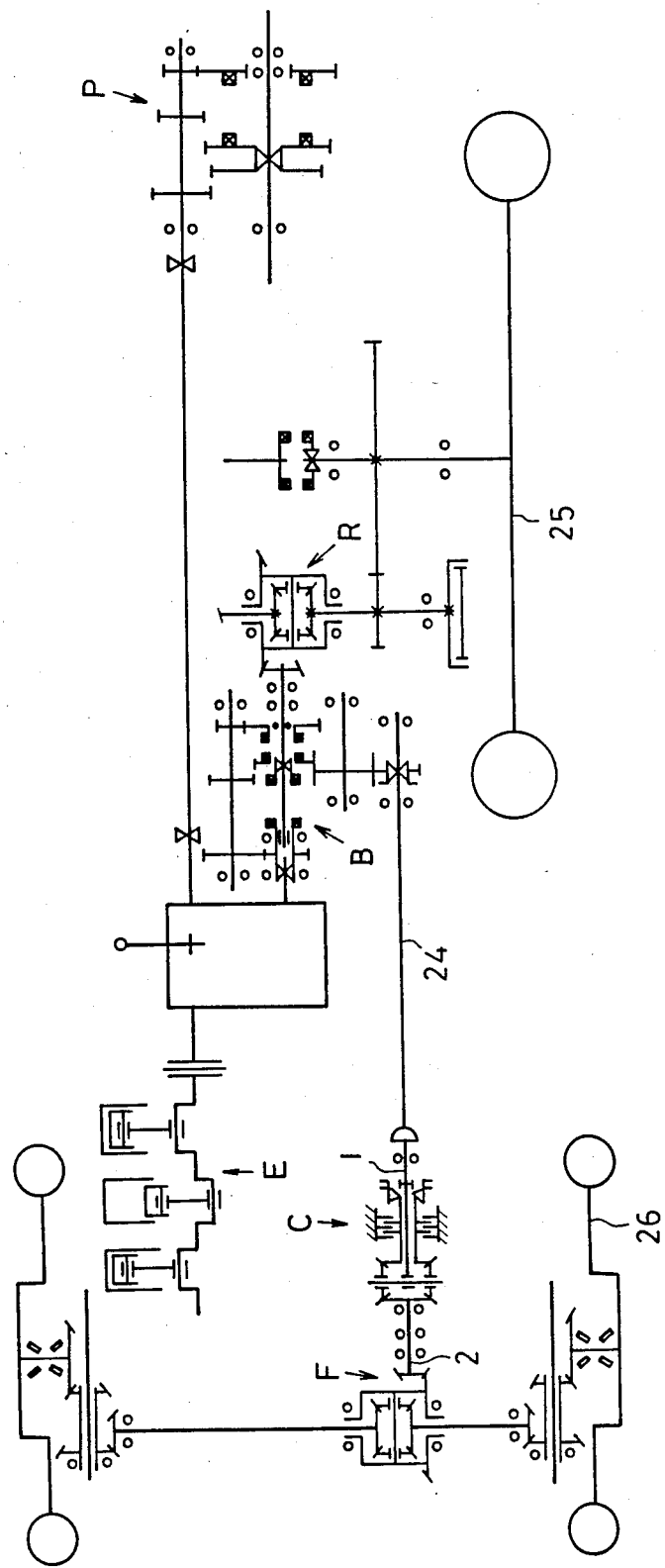
FIG. 2 is a diagram of power transmission to front and rear wheels.

Next, explanation will be given on FIG. 2.

Power of an engine E is given into a running speed change device B through a main clutch means, part of the power being given into a rear PTO speed change device P.

The running speed change device B transmits the rotation after speed change to rear wheels 25 through a rear differential gear R and to a front wheel speed-up mechanism C of the principal portion of the present invention through a front wheel power take-out shaft 24.

Therefore, the rotation increased by the front wheel speed-up mechanism C drives the front wheels through a front differential gear F.

Next, explanation will be given on the front wheel speed-up mechanism of the invention in accordance with FIGS. 3 and 4.

At the rear of a front differential case 23 is fixed a front bearing case 9a and at the rear thereof is fixed a rear bearing case 9b, these cases 9a and 9b being generally called the bearing case 9.

The outer periphery of the front bearing case 9a is pivotally supported to a center pin support 17 at the vehicle body side through a bearing 18.

Thus, the front bearing case 9a is pivotally supported to the center pin support 17, so that when a front axle laterally extending from the front differential case 23 is rotated, the front bearing case 9a instead of the center pin is rotatable as the center of rotation.

A front wheel driving shaft 1 is rotatably supported by a bearing within a rear bearing case 9b, and a front wheel pinion shaft 2 is rotatably supported coaxially with the front wheel driving shaft 1 by a bearing within the front bearing case 9a. In addition, a reference numeral 16 designates an interposed member between the front wheel pinion shaft 2 and the bearing.

At the utmost end of the front wheel driving shaft 1 is perpendicularly fixed a speed-up bevel gear shaft 10, at both ends of which are pivotally supported speed-up bevel gears 44 and 45.

Figure 9:
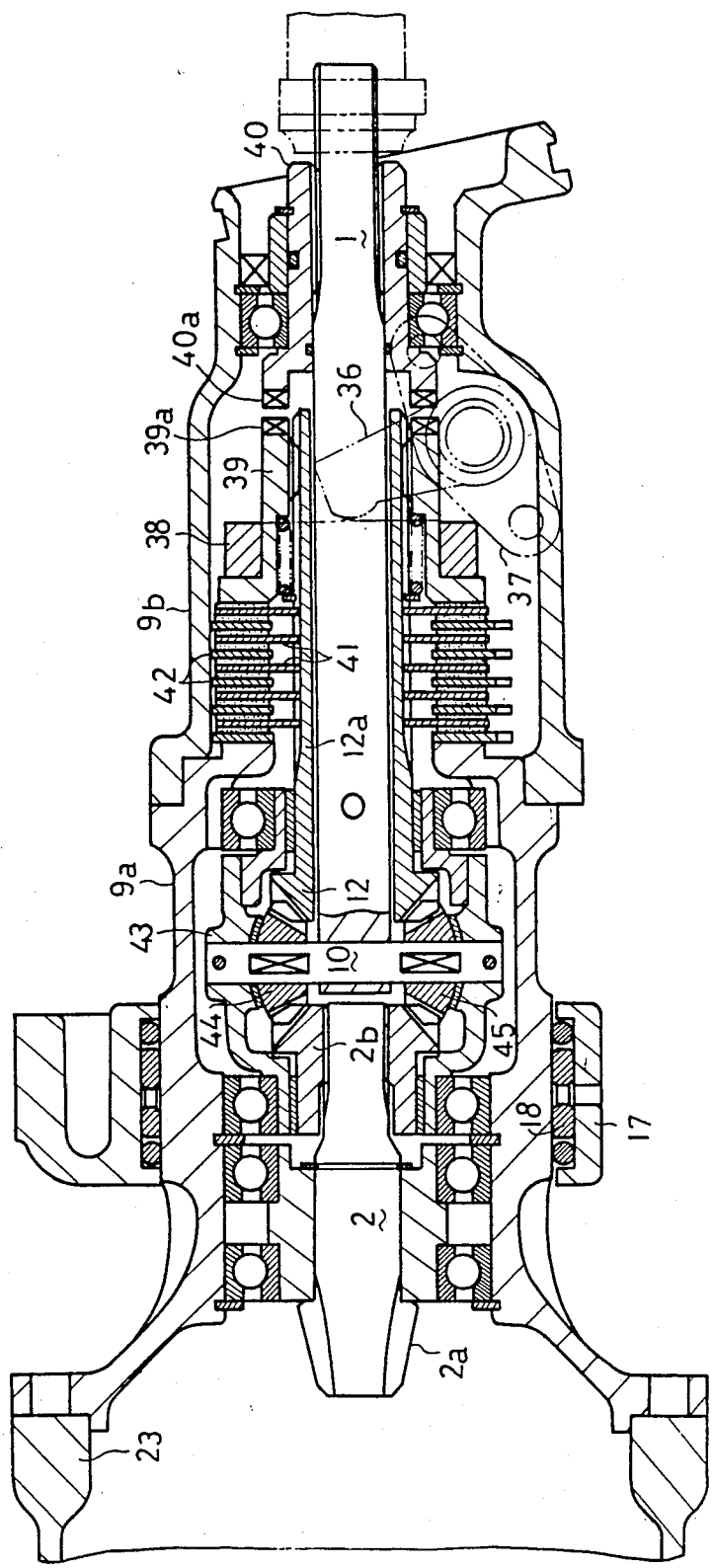
FIG. 9 is a sectional side view exemplary of the conventional four wheel drive vehicle.

In the prior art shown in FIG. 9, the bevel gear case 43 is fitted outside the speed-up bevel gears 44 and 45 so as to support the speed-up bevel gear shaft 10 and speed-up bevel gears 44 and 45.

In the present invention, however, the speed-up bevel gear 10 is provided at one axial end thereof with a flange and fixes the speed-up bevel gears 44 and 45 at the other axial end through a spacer 13 and a snap ring 14, and the speed-up bevel gear 10 is fixed directly to the front wheel driving shaft 1, thereby eliminating the bevel gear case 43 and making the front wheel speed-up mechanism small-sized.

The speed-up bevel gears 44 and 45 engage at the front side with a front wheel pinion bevel gear 2b integral with the front wheel pinion shaft 2 and at the rear side with a braking bevel gear 12.

At the front end of the front wheel pinion shaft 2 is press-fitted a pinion 2a engageable with a ring gear at a front differential gear F.

Also, the braking bevel gear 12 has a long tubular braking bevel gear boss 12a, which is freely-sleeved onto the outer periphery of the front driving shaft 1 through a bearing bush.

A retaining spline member 22 is fixed by key-coupling to the front wheel driving shaft 1 at the rear end of the braking bevel gear boss 12a, and splines equal in diameter and similar in configuration to the retaining spline member 22 are formed at the outer periphery of the braking bevel gear boss 12a.

The splines at the braking bevel gear boss 12a engage with friction plates 20 fixed to the boss 12a and a speed-up shifter 5 slidably in the order rearwardly of the vehicle.

Friction plates 21 at the fixed side engageable with the rear bearing case 9b, in the prior art in FIG. 9, are retained at the outer peripheries directly to the grooves provided at the rear bearing case 9b, but, in the embodiment of the invention, engage with retaining grooves 3c at a boss 3a of an actuator 3 slidable in the rear bearing case 9b longitudinally thereof.

The rear bearing case 9b is provided with the inner periphery slidably supporting the outer periphery of the boss 3b at the actuator 3 and the front surface in continuation of the inner periphery.

The actuator 3 comprises the boss 3a and a flange 3b integral therewith, the flange 3b forming at several portions circumferential thereof can grooves in which front half portions of balls 4 are received respectively, and being opposite to the front surface of the rear bearing case 9b, the balls 4 being received at the rear half portions into cam grooves at the same.

The friction plates 20 and 21 are alternately disposed at the braking bevel gear boss 12a and the boss 3a at the actuator 3 are supported on the front wheel driving shaft 1 axially slidably only.

At the front end of the speed-up shifter means 5 is provided an urging portion opposite to the friction plates 20 and 21 at the reverse side with respect thereto through an annular contactor 11 slidable within the boss 3a at the actuator 3.

The speed-up shifter 5, when slided forwardly, is adapted to disengage the braking bevel gear boss 12a from the retaining spline member 22, and thereafter to urge at the urging portion the friction plates 20 and 21 through the contactor 11.

At the axial inside of the front bearing case 9a is a pressure portion 9a' opposite to the friction plates 20 and 21 at the reverse side with respect to the urging portion at the shifter 5.

Especially, at the boss 3a of actuator 3 is provided another annular urging member 15 opposite to the friction plates 20 and 21 through the contactor 11 from the same side as the urging portion at the speed-up shifter 5.

A biasing spring 6 is interposed between the boss 3a and the rear bearing case 9b so that the balls 4, when not urged by the shifter 5, are biased into the cam grooves at the rear bearing case 9b, and the urging member 15 provided inside the boss 3a is moved axially rearwardly, thereby releasing the friction plates 20 and 21 in non-contact condition.

Also, a biasing spring 7 is interposed between the urging member 15 within the boss 3a and the speed-up shifter 5, which serves as a low pressure spring for always connecting the braking bevel gear boss 12a with the retaining spline member 22 by the speed-up shifter 5 when the steering handle 27 is not rotated. Alternatively, the spring 7 may be provided between the external links. In addition, the friction plates 20 and 21 are used which are larger in the coefficient of dynamic friction.

Figure 6:
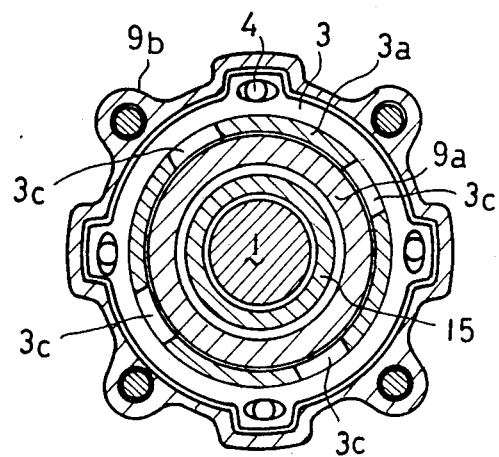
FIG. 6 is a sectional view taken on the line A—A in FIG. 3.

As shown in FIG. 6, the actuator 3 is regulated to be rotatable by the rear bearing case 9b only at a affixed angle of riding up from the depth to the crest of each cam groove at the flange 3b with respect to each ball 4.

Next, explanation will be given on operation of the front wheel speed-up mechanism of the invention in accordance with FIGS. 4 through 8.

Figure 7:
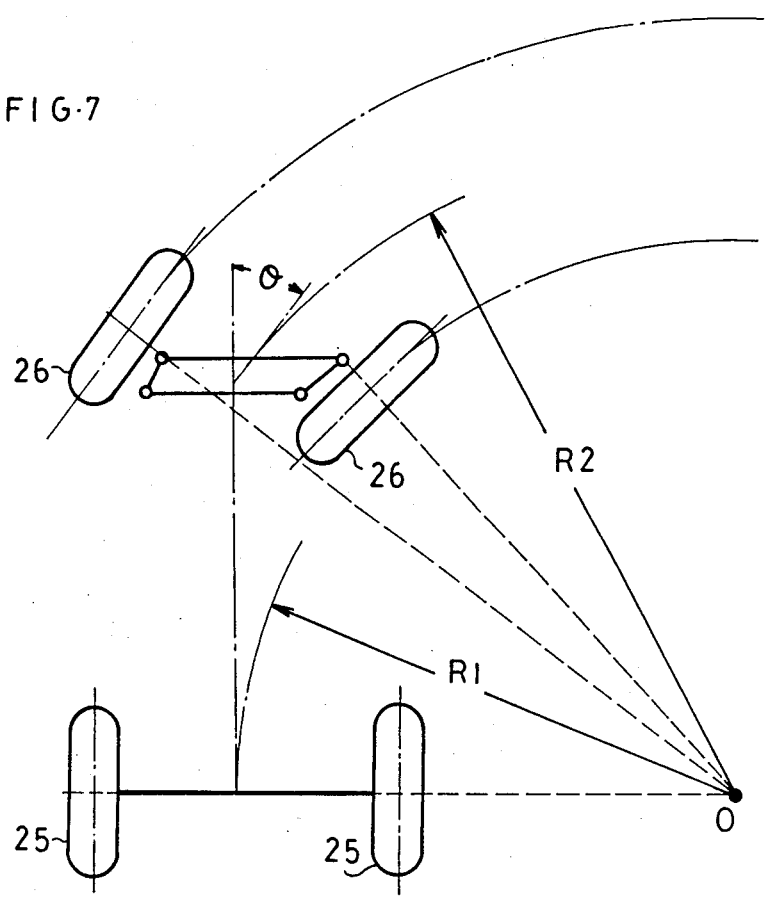
FIG. 7 is an operational diagram showing that the front wheels are required to speed-up when the four wheel drive vehicle is turned.

When the four wheel drive vehicle is driven forwardly, the front wheels 26 and rear wheels 25 run at equal speed to each other, but when the steering handle 27 is operated to turn the vehicle as shown in FIG. 7, in order to smoothly turn it, a point on an extension of an axle line of rear wheels 25 is used as the center 0 around which the front wheels 26 and rear wheels 25 are steered to turn.

Therefore, the front wheels 26 and rear wheels 25 travel at equal speed when forwardly moving, but the front wheels 26 pass on a circular arc of larger radius R2, the rear wheels 25 passing on that of smaller radius R1, whereby the speed of front wheel 26 theoretically does not coincide with that of the rear wheels.

In other words, since the vehicle runs at the standard of rear wheel 25, the rotational circumferential speed of the front wheels decreases more than the actually moving speed of the front wheels, which puts the front wheels in a dragging condition to result in drawing a lawn or scratching soft soil.

A difference between the actual moving speed and the rotational speed of the front wheels, moves the steering center O corresponding to variation in a rotation angle $\theta$ of the front wheels by the steering handle 27, whereby the speed of front wheel must be increased corresponding to the rotation angle $\theta$.

In the present invention, when the vehicle moves nearly straight moves, shifter arm 34 and 35 for forwardly moving the speed-up shifter 5 are not actuated.

Figure 3:
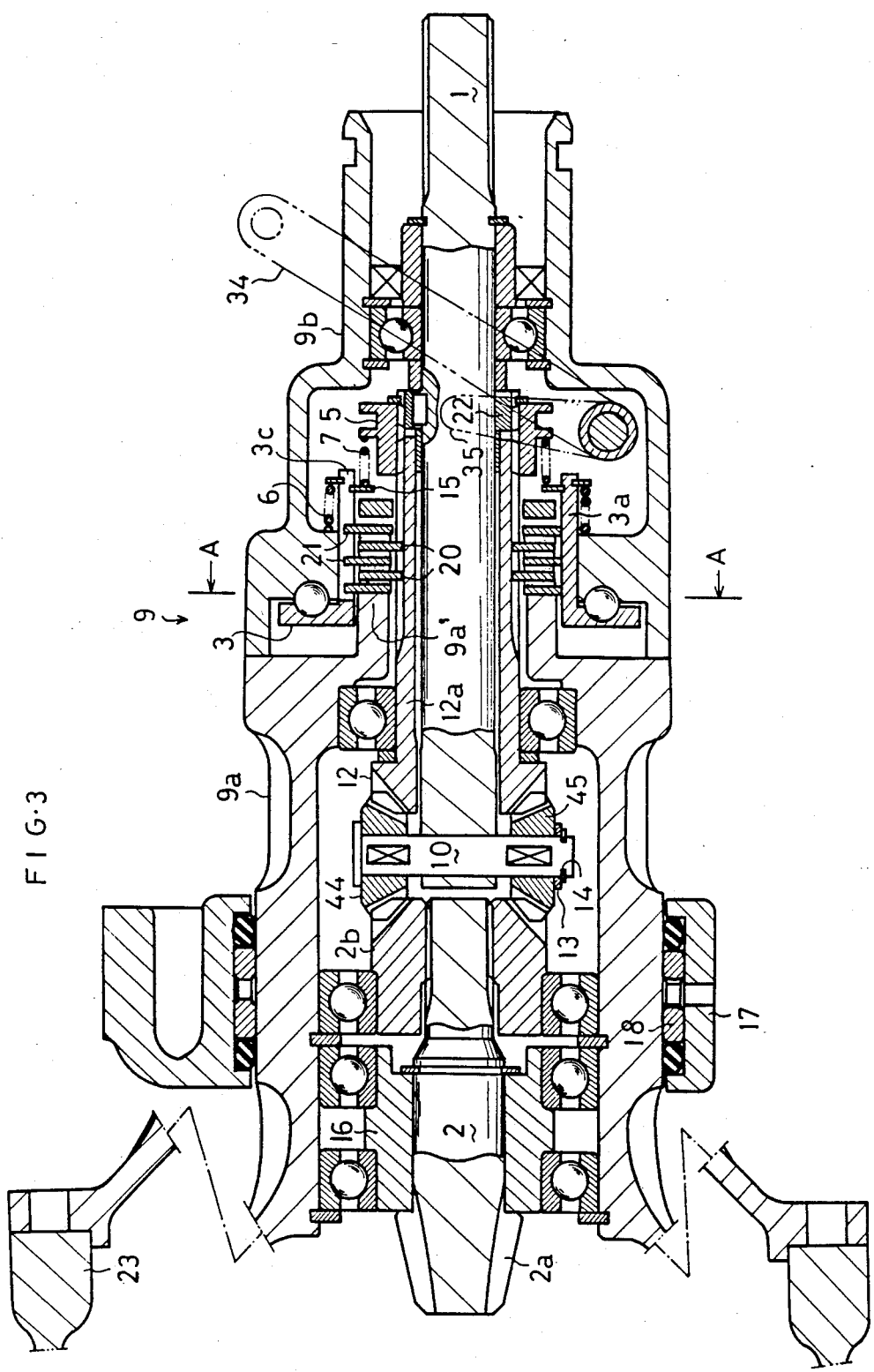
FIG. 3 is a sectional side view of the principal portion of the front wheel speed-up mechanism when the vehicle is turned.

In other words, in the state of FIG. 3 the speed-up shifter 5 engages with both the retaining spline member 22 and the splines at the braking bevel gear boss 12a and the front wheel driving shaft 1 and braking bevel gear 12 rotate together only by revolution of the speed-up bevel gears 44 and 45, whereby the front wheel driving shaft 1 and front wheel pinion shaft 2 rotate integrally with each other, thereby making the speeds of rear wheel 25 and front wheels 26 equal to each other.

Next, when the steering handle 27 is rotated to turn the vehicle, the shifter arm 35 is actuated at a fixed rotation angle $\theta$ and the speed-up shifter 5 disengages from the retaining spline member 22.

Simultaneously with disengagement of the speed-up shifter 5 from the retaining spline member 22, when the speed-up shifter 5 begins to push the contactor 11, rotation of braking bevel gear boss 12a lowers. Conversely, the speed-up bevel gears 44 and 45 in revolution through the speed-up bevel gear shaft 10 start rotation, thereby increasing the speed of front wheel pinion bevel gear 2b.

Figure 4:
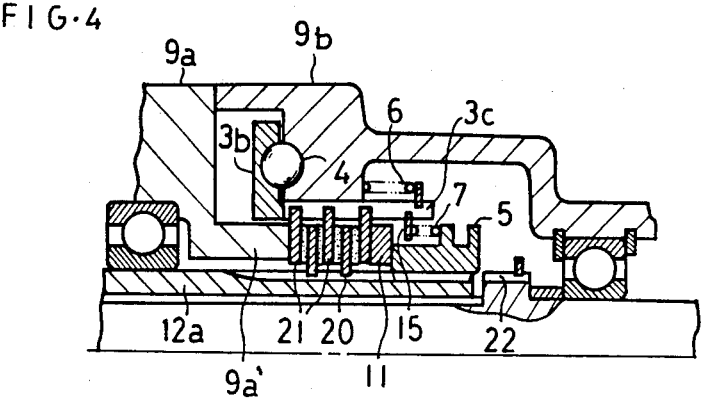
FIG. 4 is a sectional side view showing the state where a speed-up shifter urges friction plates during the initial turning.
Figure 5:
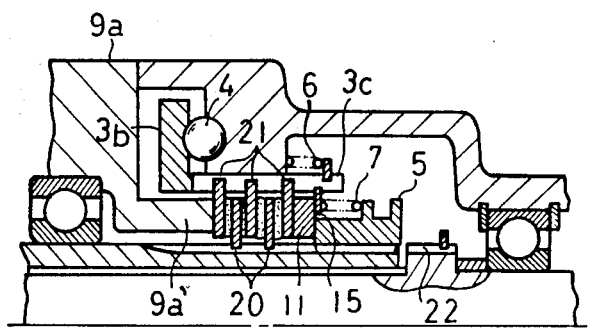
FIG. 5 is a sectional side view showing the state where an actuator is slided forwardly by cam balls so as to urge the friction plates.

In other words, as shown in FIG. 4, at the position where the speed-up shifter 5 disengages from the retaining spline member 22, it abuts against the contactor 11 to contact with the friction plates 20 and 21, whereby the torque of braking bevel gear boss 12a acts to rotate the actuator 3.

The actuator 3 rotates at a certain angle from the bottom to the crest of the cam groove with respect to the balls 4 and moves forward away from the speed-up shifter to an extent that each ball 4 rides on the crest.

The forward movement of the actuator 3 allows the urging member 15 provided in the boss 3a to push the contactor 11, and urges the friction plates 20 and 21 toward the pressure portion 9a' at the front bearing case 9a, thereby increasing an engaging force between the friction plates 20 and 21. Such an automatic effect exerts the braking action on rotation of the braking bevel gear boss 12a.

When braking is applied to the braking bevel gear boss 12a rotatable by revolution of the speed-up bevel gears 44 and 45, the gears 44 and 45 rotate in addition to revolution, whereby the rotational speed of the front wheel pinion bevel gear 2b increases.

The braking effect applied to the braking bevel gear boss 12a is further raised because an amount of rotation of the steering handle 27 is increased to increase an amount of forward movement of the speed-up shifter 5 so that the larger the torque acting on the actuator 3 is, the more an amount of riding-on or thrust of each ball 4 from the bottom to the crest of the cam groove increases to thereby allow the friction plates 20 and 21 to further tightly engage with each other.

Accordingly, the rotational speeds of the speed-up bevel gears 44 and 45 further increase and rotation of the front wheel pinion bevel gear 2b increases.

When the steering handle 27 is rotated to the abrupt turning position, the braking bevel gear boss 12a completely stops so that the front wheels 26 rotate about two times as fast as when straight forward movement.

When the steering handle 27 is returned to the original straight forward moving condition, the speed-up shifter 5 moves backwardly to release the urged friction plates 20 and 21 to reduce a force to rotate the actuator 3, the biasing spring 6 moves the actuator 3 backwardly, and the automatic effect by the urging member 5 in the actuator 3 is released, the speed-up shifter 5 moving by the biasing spring 7, whereby the braking bevel gear boss 12a and retaining spline member 22 are integral with each other.

Figure 8:
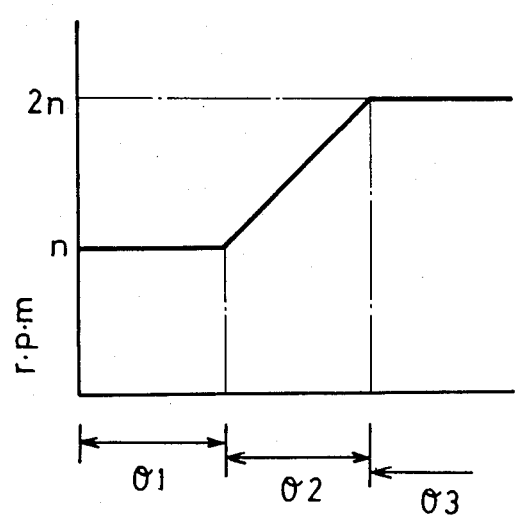
FIG. 8 is a graph showing the state where the number of rotations of front wheels increases on the basis of steering to turn a steering handle.

In order to match the rotational angle $\theta$ of each front wheel 26 by operating the steering handle 27 with a speed-up amount, a curve in FIG. 8 is depicted to increase the speed, in which at a section of $\theta 1$ the braking bevel gear 12 is retained to the front wheel driving shaft 1, at that of $\theta 2$ the aforesaid retaining condition is released to gradually exert the braking action to the braking bevel gear 12, and at that of $\theta 3$ the braking bevel gear 12 stops its rotation.

While a preferred embodiment of the invention has been described using specific terms, such description is for illustrative purposes only, and it is to be understood that changes and variations may be made without departing from the spirit or scope of the following claims.

What is claimed is:

1. A front wheel speed-up mechanism for a four wheel drive vehicle when turning comprising:
   a speed-up bevel gear shaft provided perpendicularly to the utmost end of a front wheel driving shaft,
   speed-up bevel gears freely sleeved onto both axial ends of said bevel gear shaft,
   said speed-up bevel gears engage with a front wheel pinion bevel gear provided at the rear end of a front wheel pinion shaft, and a braking bevel gear freely sleeved onto the outer periphery of said front wheel driving shaft, a braking bevel gear boss at said braking bevel gear freely sleeved onto the outer periphery of said front wheel driving shaft, friction plates interposed between said braking gear boss and an actuator supported within a bearing case and being rotatable at a fixed angle to said bearing case and slidable axially of said front wheel driving shaft, said friction plates abut at one end against a pressure receiving surface formed in said bearing case, whereby said friction plates can be urged at their other end by a speed-up shifter toward an urging member fixed to said actuator, said speed-up shifter, when said vehicle travels straight forward, retains said braking bevel gear boss integrally with said front wheel driving shaft, and slides in association with turning of a steering handle of said vehicle in the direction of releasing retainment between both said braking bevel gear boss and said front wheel driving shaft, thereby releasing said friction plates after said shifter moves in the releasing direction away from said urging member, and said actuator rotates by friction caused by said friction plates and balls which are disposed in cam grooves constituted between said bearing case and said actuator so as to slide said urging member in the direction of urging said friction plates toward said pressure receiving surface.

2. A front wheel speed-up mechanism for a four-wheel drive vehicle, comprising:

a bearing case;

a front-wheel driving shaft and a front-wheel pinion shaft located within said bearing case;

a speed-up bevel gear shaft provided perpendicular to said front-wheel driving shaft;

speed-up bevel gears freely sleeved onto both axial ends of said speed-up bevel gear shaft;

a front-wheel pinion gear provided on said front-wheel pinion shaft for engaging with said speed-up bevel gears;

a braking bevel gear freely sleeved onto said front wheel driving shaft for engaging with said speed-up bevel gears;

said braking bevel gear including a boss, said boss having a rotation;

an actuator rotatably supported within said bearing case and being slidable axially of said front-wheel driving shaft;

at least one urging member affixed to said actuator;

friction plates interposed between said breaking bevel gear boss and said actuator;

a speed-up shifter slidable axially of said front-wheel driving shaft;

whereby said speed-up shifter is adapted to retain said braking bevel gear integral with said front-wheel driving shaft when said vehicle is traveling straight forward, and to urge said friction plates against said urging member to thereby stop rotation of said braking bevel gear when said vehicle is turning.

3. A front-wheel speed-up mechanism for a four wheel drive vehicle as recited in claim 2, further comprising:

a contactor disposed within said bearing case between said actuator and said braking bevel gear boss, whereby said speed-up shifter abuts against said contactor to contact said friction plates; and said boss having a torque, whereby said torque of said braking bevel gear boss acts to rotate said actuator and to move said actuator forward.

4. A front-wheel speed-up mechanism as recited in claim 2, further comprising:

a pressure portion disposed at a front of said bearing case, wherein said forward movement of said actuator allows said urging member to push said contactor and thereby urge said friction plates toward said pressure portion, thereby exerting a braking action on the rotation of said braking bevel gear boss.

5. A front-wheel speed-up mechanism for a four-wheel drive vehicle, comprising:

a bearing case;

a front-wheel driving shaft located within said case;

a braking bevel gear provided on said shaft, said braking bevel gear including a boss, wherein said boss has a rotation;

an actuator rotatably supported within said bearing case and being slidable axially of said front-wheel driving shaft;

friction plates interposed between said boss and said actuator; and speed-up shifter means, said speed-up shifter means being slidable axially at said front-wheel driving shaft for retaining said braking bevel gear integral with said front wheel driving shaft when said vehicle is travelling straight forward and for urging said friction plates against said urging member to thereby stop rotation of said braking bevel gear when said vehicle is turning.

6. A front-wheel speed-up mechanism as recited in claim 5, further comprising:

a contactor disposed within said bearing case between said actuator and said boss, whereby said speed-up shifter means abuts against said contactor to contact said friction plates; and said braking bevel gear boss having a torque, whereby said torque of said braking bevel gear boss acts to rotate said actuator and to move said actuator forward.

7. A front-wheel speed up mechanism as recited in claim 5, further comprising:

a pressure portion disposed at a front of said bearing case, wherein said forward movement of said actuator allows said urging member to push said contactor and thereby urge said friction plates toward said pressure portion, thereby exerting a braking action on the rotation of said braking bevel gear boss.

* * * * *